(12) United States Patent
Lim

(10) Patent No.: US 8,027,073 B2
(45) Date of Patent: Sep. 27, 2011

(54) IMAGE FORMING APPARATUS WITH LASER SCANNING DEVICE AND METHOD OF ALIGNING THE LASER SCANNING DEVICE

(75) Inventor: Kyung Min Lim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 606 days.

(21) Appl. No.: 12/133,502

(22) Filed: Jun. 5, 2008

(65) Prior Publication Data

US 2009/0103156 A1   Apr. 23, 2009

(30) Foreign Application Priority Data

Oct. 17, 2007 (KR) .............................. 2007-0104440

(51) Int. Cl.
*G02B 5/00* (2006.01)
*B41J 29/12* (2006.01)

(52) U.S. Cl. ............... 359/205.1; 359/212.1; 359/213.1; 359/613; 359/614; 359/894; 347/241; 347/256; 250/237 R

(58) Field of Classification Search ............... 359/215.1, 359/221.1, 221.2, 601, 613, 614, 894, 199.1, 359/201.1, 205.1, 212.1, 213.1; 347/138, 347/234, 235, 241, 242, 243, 248, 250, 256–260, 347/263; 250/234, 235, 236, 237 R
See application file for complete search history.

(56) References Cited

U.S. PATENT DOCUMENTS

| | | | | |
|---|---|---|---|---|
| 4,350,988 | A * | 9/1982 | Masegi | 347/250 |
| 4,351,005 | A * | 9/1982 | Imai et al. | 358/300 |
| 4,493,990 | A * | 1/1985 | Koszytorz et al. | 250/236 |
| 4,800,270 | A * | 1/1989 | Blais | 250/235 |
| 5,214,531 | A * | 5/1993 | Torii et al. | 359/223.1 |
| 5,663,558 | A * | 9/1997 | Sakai | 250/234 |
| 6,509,921 | B2 * | 1/2003 | Komiya et al. | 347/235 |
| 6,590,223 | B1 * | 7/2003 | Chelvayohan | 250/559.4 |
| 7,538,315 | B2 * | 5/2009 | Matsumoto | 250/236 |
| 7,626,605 | B2 * | 12/2009 | Nomura et al. | 347/236 |
| 7,697,184 | B2 * | 4/2010 | Sakaue et al. | 359/212.1 |
| 7,884,842 | B2 * | 2/2011 | Ishihara | 347/235 |
| 2005/0057557 | A1 * | 3/2005 | Kobayashi et al. | 345/213 |
| 2005/0275710 | A1 | 12/2005 | Dewa et al. | |
| 2008/0049095 | A1 * | 2/2008 | Ishihara et al. | 347/247 |

* cited by examiner

*Primary Examiner* — Frank Font
(74) *Attorney, Agent, or Firm* — Staas Halsey LLP

(57) ABSTRACT

An image forming apparatus includes a light source to emit a laser beam; a resonant scanning mirror, including a reflection surface to reflect the laser beam emitted from the light source, to scan the reflected laser beam by oscillating the reflection surface; at least one detector to detect the reflected laser beam during the scanning of the reflected laser beam, and generate a synchronizing signal each time the reflected laser beam is detected; and at least one light selection unit to restrict a path over which the reflected laser beam is incident on the at least one detector to a predetermined path.

24 Claims, 7 Drawing Sheets

IMAGE FORMING APPARATUS WITH LASER SCANNING DEVICE AND METHOD OF ALIGNING THE LASER SCANNING DEVICE

CROSS-REFERENCE TO RELATED APPLICATIONS

This application claims the benefit of Korean Patent Application No. 2007-104440 filed on Oct. 17, 2007, in the Korean Intellectual Property Office, the disclosure of which is incorporated herein by reference in its entirety.

BACKGROUND OF THE INVENTION

1. Field of the Invention

Aspects of the invention relate to an image forming apparatus with a laser scanning device and a method of aligning the laser scanning device, and more particularly to an image forming apparatus equipped with a laser scanning device capable of performing bidirectional laser scanning using a resonant scanning mirror, and a method of aligning the laser scanning device.

2. Description of the Related Art

In general, an image forming apparatus is a device that prints out black-and-white images or color images onto a recording medium such as paper in accordance with image signals. Examples of such an image forming apparatus include a laser printer, an inkjet printer, a photocopier, a digital multifunction printer, a facsimile machine, and the like. The various image forming apparatuses create an image generally by an electrophotographic method or an inkjet method. In the electrophotographic method, an electrostatic latent image is formed on a photoconductive medium by scanning the photoconductive medium with a laser beam. Then, developer is adhered to the photoconductive medium corresponding to the electrostatic latent image, and a thus-formed developer image is transferred to a recording medium, thereby forming a final image. The inkjet method forms an image by spraying liquid ink on a recording medium in accordance with image signals.

An electrophotographic image forming apparatus forms a desired image using the following process. First, a surface of the photoconductive medium is charged to a predetermined electric potential. A laser beam is emitted onto the surface of the charged photoconductive medium to thereby form an electrostatic latent image. A visible image is formed by adhering powder-type developer to the electrostatic latent image. Next, the visible image formed by the developer is transferred to a recording medium and fixed on the recording medium by heat and pressure.

The electrophotographic image forming apparatus is equipped with a laser scanning device that forms the electrostatic latent image by scanning the photoconductive medium with a laser beam in accordance with image signals. The laser scanning device includes a light source that generates the laser beam according to the image signals, a collimator lens that forms a parallel laser beam from the laser beam emitted from the light source with respect to an optical axis, a cylinder lens that converts the parallel laser beam emerging from the collimator lens to a linear laser beam that is horizontal with respect to a vertical scanning direction, a polygon mirror that reflects the linear laser beam emerging from the cylinder lens and scans the reflected laser beam in a horizontal scanning direction, an fθ lens that focuses the reflected laser beam scanned by the polygon mirror on the photoconductive medium by compensating for an aberration of the scanned laser beam, and a detector that detects the scanned laser beam and generates a synchronizing signal each time the scanned laser beam is detected. These component parts are all mounted in a single frame as one integrated unit.

Recently, the tendency has been to increase the rotation speed of the polygon mirror to improve a printing speed of the image forming apparatus. Therefore, the cost to achieve this has been increasing.

To this end, there has been introduced a method of employing a flat mirror having a reflection surface, which is relatively inexpensive, instead of the polygon mirror rotating at a high speed, as disclosed in U.S. Patent Application Publication No. 2005-0275710 published on Dec. 15, 2005.

According to the disclosed method, a photoconductive medium is scanned in accordance with image signals in a forward direction and then a backward direction using a resonant scanning mirror in which the reflection surface that reflects the laser beam is oscillated at a resonant frequency.

In order to accurately form the electrostatic latent image on the photoconductive medium according to the image signals, all component parts of a laser scanning device including the resonant scanning mirror, including an incident optical system including the collimator lens and the cylinder lens, must be precisely and stably mounted on a housing.

When the resonant scanning mirror is used to deflect the laser beam, synchronizing signals are generated using different detectors corresponding to the different scanning directions, that is, the forward scanning direction and the backward scanning direction. Thus, the positions of the detectors mounted on the housing as well as the position of the resonant scanning mirror oscillating at the resonant frequency to deflect the laser beam must be strictly controlled.

For accurate generation of the synchronizing signals, the plurality of detectors generating the synchronizing signals and the resonant scanning mirror must be placed at correct positions. If an error occurs in mounting the resonant scanning mirror on the housing during assembly, the resonant scanning mirror may not be synchronized properly, or the scanning may be performed according to incorrectly generated synchronizing signals. Accordingly, the ability to check the position of the resonant scanning mirror after assembly is required.

SUMMARY OF THE INVENTION

According to an aspect of the invention, an image forming apparatus with a laser scanning device and a method of aligning the laser scanning device enable the alignment of a resonant scanning mirror to be checked more easily and precisely.

According to an aspect of the invention, an image forming apparatus with a laser scanning device and a method of aligning the laser scanning device reduce the cost of checking the alignment of a resonant scanning mirror by using fewer components.

According to an aspect of the invention, an image forming apparatus includes a light source to emit a laser beam; a resonant scanning mirror, including a reflection surface to reflect the laser beam emitted from the light source, to scan the reflected laser beam by oscillating the reflection surface; at least one detector to detect the reflected laser beam during the scanning of the reflected laser beam, and generate a synchronizing signal each time the reflected laser beam is detected; and at least one light blocking unit to restrict a path over which the reflected laser beam is incident on the at least one detector to a predetermined path.

According to an aspect of the invention, the at least one detector includes a plurality of detectors; and the at least one light blocking unit includes a plurality of light blocking elements corresponding to the plurality of detectors.

According to an aspect of the invention, each of the light blocking units includes a plurality of light blocking elements arranged at different predetermined distances between a corresponding one of the detectors and the resonant scanning mirror; and each of the light blocking elements includes a pair of projections facing each other across a gap.

According to an aspect of the invention, each of the light blocking units includes a body having a slit formed therein.

According to an aspect of the invention, the image forming apparatus further includes a deflection unit including the resonant scanning mirror; and a housing on which the light source, the deflection unit including the resonant scanning mirror, and the detector are mounted as an integrated unit; and the at least one light blocking unit is an integral part of the housing.

According to an aspect of the invention, the housing is an injection-molded plastic housing; and the at least one light blocking unit is an integral injection-molded plastic portion of the injection-molded plastic housing.

According to an aspect of the invention, an image forming apparatus includes a light source to emit a laser beam; a resonant scanning mirror to reflect the laser beam emitted from the light source, and scan the reflected laser beam in a plurality of scanning directions; a plurality of detectors to detect the reflected laser beam during the scanning of the reflected laser beam, and generate synchronizing signals for each of the plurality of scanning directions; a light blocking unit to restrict paths over which the reflected laser beam is incident on the plurality of detectors to a plurality of predetermined paths; and an alignment checking unit to check an alignment of the resonant scanning mirror based on the synchronizing signals generated by the plurality of detectors when the reflected laser beam is incident on the plurality of detectors over the plurality of predetermined paths.

According to an aspect of the invention, the alignment checking unit includes a controller to detect the synchronizing signals generated by the detectors; determine a time difference between detection times of two synchronizing signals generated by each of the detectors during one scanning cycle of the resonant scanning mirror; compare the time difference with a preset reference time; and determine whether the resonant scanning mirror is aligned correctly based on a result of the comparison; a memory to store information indicative of the preset reference time; and a display unit to display an indication of whether the resonant scanning mirror is aligned correctly under control of the controller.

According to an aspect of the invention, the plurality of detectors may be implemented by an optical sensor.

According to an aspect of the invention, the controller includes a counter to determine the time difference.

According to an aspect of the invention, the resonant scanning mirror includes a reflection surface that oscillates at a predetermined resonant frequency to perform forward and backward scanning.

According to an aspect of the invention, a method of aligning an image forming apparatus includes emitting a laser beam from a light source so that the laser beam is incident on a resonant scanning mirror and is reflected by the resonant scanning mirror; oscillating the resonant scanning mirror to scan the reflected laser beam in a plurality of scanning directions; restricting a path over which the reflected laser beam is incident on at least one detector to a predetermined path; detecting a synchronizing signal generated by the at least one detector when the reflected laser beam is incident on the at least one detector over the predetermined path; determining a time difference between detection times of two synchronizing signals generated by the at least one detector; comparing the time difference with a preset reference time; determining whether the resonant scanning mirror is aligned correctly based on a result of the comparison; and displaying an indication of whether the resonant scanning mirror is aligned correctly.

According to an aspect of the invention, the at least one detector includes a plurality of detectors; and the determining of a time difference includes determining a time difference between detection times of two synchronizing signals generated by each of the detectors during one scanning cycle of the resonant scanning mirror.

According to an aspect of the invention, the determining of whether the resonant scanning mirror is aligned correctly comprises determining that the resonant scanning mirror is not aligned correctly when the time difference is not equal to the preset reference time.

According to an aspect of the invention, a laser scanning device includes a light source to emit a laser beam; a resonant scanning mirror to reflect the laser beam emitted from the light source and alternately scan the reflected laser beam in a first scanning direction between a first scan end point and a second scan end point, and a second scanning direction between the second scan end point and the first scan end point; a first detector to detect the reflected laser beam and generate a first synchronizing signal when the reflected laser beam is approaching the first scan end point while being scanned in the second scanning direction, and a second synchronizing signal when the reflected laser beam is receding from the first scan end point while being scanned in the first scanning direction; and a first light blocking unit to prevent the reflected laser beam from being incident on the first detector during the scanning of the reflected laser beam except when the resonant scanning mirror is disposed at a predetermined location.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which.

DETAILED DESCRIPTION OF THE EMBODIMENTS

Figure 1:
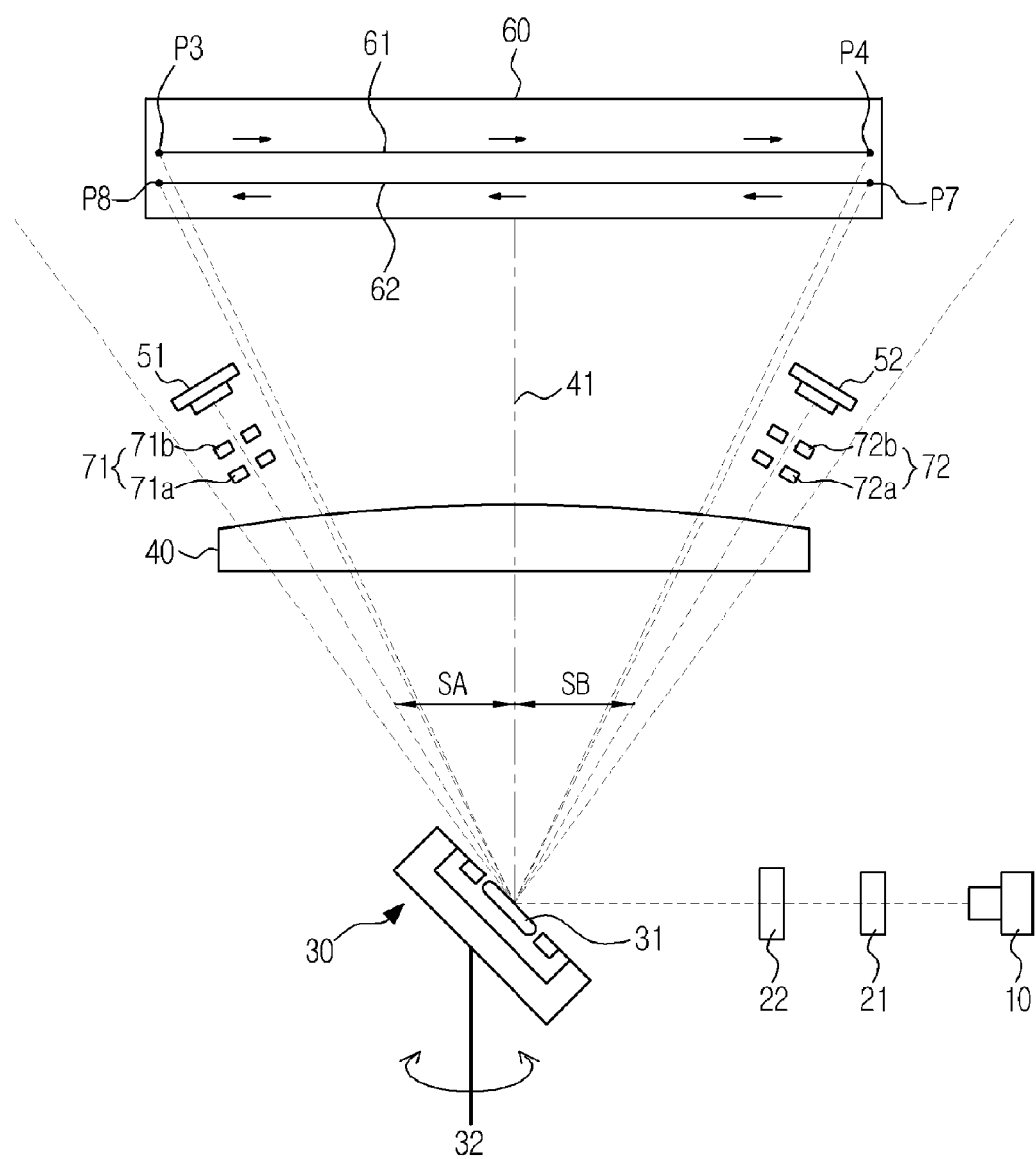
FIG. 1 shows the structure of a. laser scanning device according to an aspect of the invention.

Reference will now be made in detail to embodiments of the invention, examples of which are shown in the accompanying drawings, wherein like reference numerals refer to like elements throughout. The embodiments are described below to explain the invention by referring to the figures.

An image forming apparatus with a laser scanning device and a method of aligning the laser scanning device according to aspects of the invention will now be described. The laser scanning device according to aspects of the invention is applicable to an electrophotographic image forming apparatus. Since the structure of the electrophotographic image forming apparatus itself is well known to one of ordinary skill in the art, a detailed description will be provided of only the laser scanning device according to aspects of the invention.

As shown in FIG. 1, a laser scanning device according to an aspect of the invention includes a light source 10 implemented by a laser diode to generate a laser beam, a collimator lens 21 converting the laser beam emitted from the light source 10 to a parallel laser beam that is parallel with an optical axis, a cylinder lens 22 converting the parallel laser beam to a linear laser beam that is horizontal relative to a vertical scanning direction, a deflection unit 30 having a resonant scanning mirror 31 to reflect the linear laser beam and scan the reflected laser beam in the horizontal scanning direction, an fθ lens 40 focusing the reflected laser beam scanned by the resonant scanning mirror 31 on a photoconductive medium 60 by compensating an aberration of the reflected laser beam scanned by the resonant scanning mirror 31 so that the reflected laser beam is scanned across the photoconductive medium 60 at a constant speed, and first and second detectors 51 and 52 detecting the reflected laser beam scanned by the resonant scanning mirror 31 and generating a synchronizing signal each time the reflected laser beam is detected.

The resonant scanning mirror 31 has a reflection surface to reflect the linear laser beam from the cylinder lens 22, and is oscillated by a driving source (not shown) about a rotational axis 32 at a predetermined resonant frequency to scan the reflected laser beam in forward backward scanning directions. Since exemplary structures of the resonant scanning mirror 31 and the driving source are disclosed in U.S. Patent Application Publication No. 2005-0275710 published on Dec. 15, 2005, a detailed description thereof will be omitted herein.

The reflected laser beam scanned by the resonant scanning mirror 31 performs scanning in a reciprocating motion. A scanning area of the laser beam is symmetrical with respect to a center line 41.

The laser beam scans a surface of the photoconductive medium 60 in accordance with image signals within a range of a first effective scanning section SA and a second effective scanning section SB of the scanning area. At both ends of the scanning area excluding the first and second effective scanning sections SA and SB, that is, at a left end of the scanning area beyond a range detectable by the first detector 51 when the laser beam performs a leftward scanning, and a right end of the scanning area beyond a range detectable by the second detector 52 when the laser beam performs a rightward scanning, the surface of the photoconductive medium 60 is not scanned by the laser beam.

A first image line 61 is formed on the photoconductive medium 60 during a rightward or forward scanning, and a second image line 62 is formed on the photoconductive medium during a leftward or backward scanning. This bidirectional scanning is continuously repeated to scan the entire photoconductive medium 60.

The first and second detectors 51 and 52 each include an optical sensor for detecting the laser beam and outputting a synchronizing signal each time the laser beam is detected for use as a reference signal in forming the first and second image lines 61 and 62 at correct positions on the photoconductive medium 60. The plurality of synchronizing signals are supplied to a signal processing block (not shown) that generates a laser beam in accordance with the image signals. The light source 10 emits the laser beam according to image data supplied from the signal processing block and the synchronizing signals. In addition, the plurality of synchronizing signals are supplied to a controller that checks an alignment of the resonant scanning mirror 31. The controller will be described later.

Additionally, first and second light blocking units 71 and 72 are provided to restrict a path over which the laser beam is incident on the first and second detectors 51 and 52, respectively. The reason for restricting the incident path of the laser beam is so that the laser beam is incident on the detectors 51 and 52 only when the resonant scanning mirror 31 is disposed at a reference position and is operating normally in order to check the alignment of the resonant scanning mirror 31. More specifically, the light blocking units 71 and 72 transmit the reflected laser beam scanned by the resonant scanning mirror 31 to the first and second detectors 51 and 52 only when the resonant scanning mirror is disposed at the reference position and is operating normally. Otherwise, when the resonant scanning mirror 31 is deviated from the reference position, or when the scanning area of the laser beam is asymmetrical with respect to the center line 41, even though the resonant scanning mirror 31 is disposed at the reference position but is not operating normally, the light blocking units 71 and 72 block the laser beam to prevent the laser beam from being incident on the detectors 51 and 52.

The first light blocking unit 71 includes a plurality of light blocking elements 71a and 71b arranged between the first detector 51 and the resonant scanning mirror 31 at a predetermined distance from each other. The respective light blocking elements 71a and 71b each include a pair of projections disposed at a predetermined distance facing each other across a gap to transmit the laser beam through the gap and allow the laser beam to be incident on the first detector 51.

One of the light blocking elements 71a and 71b, for example, the blocking element 71a, is disposed closer to the resonant scanning mirror 31, while the other blocking element, for example, the blocking element unit 71b, is disposed closer to the first detector 51.

Figure 2A:
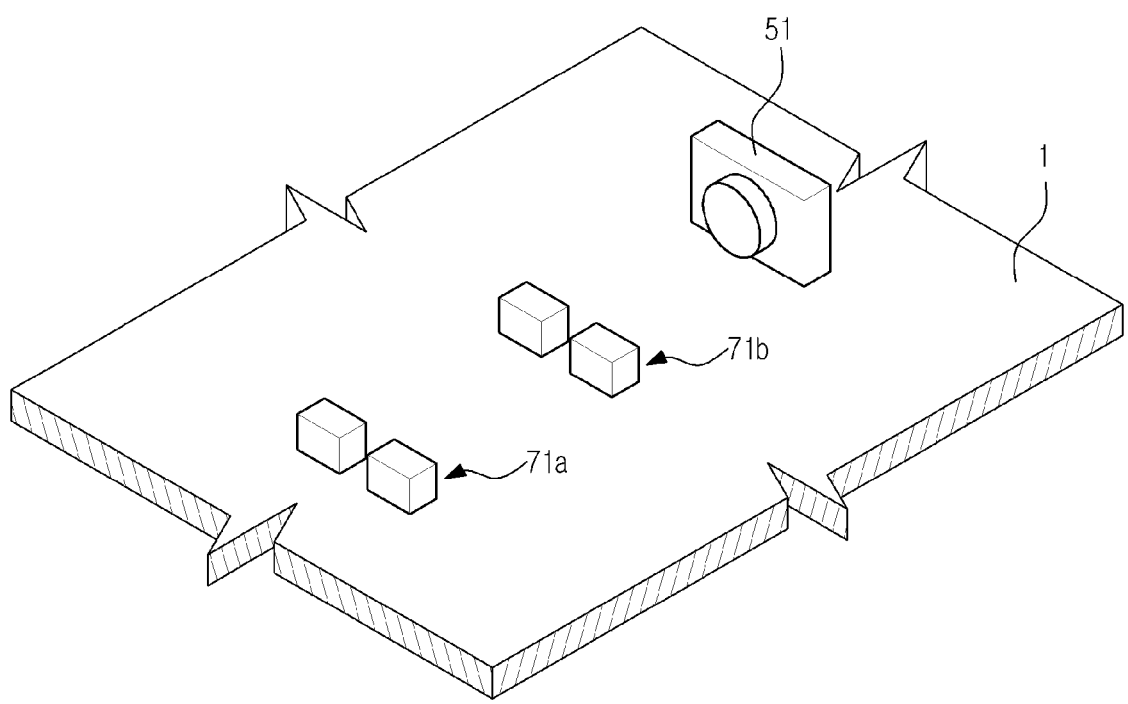
FIG. 2A is a perspective view of a light blocking unit shown in FIG. 1 that is integrally formed with a housing according to an aspect of the invention.

The plurality of light blocking elements 71a and 71b are mounted as an integrated unit along with other components. As shown in FIG. 2A, for example, the plurality of light blocking elements 71a and 71b may be formed as an integral part of a housing 1 on which the first detector 51 is mounted. To achieve this, the housing 1 may be formed from plastic by injection molding, and the light blocking units 71a and 71b may be formed as an integral injection-molded plastic portion of the injection-molded plastic housing 1.

The second light blocking unit 72 includes a plurality of light blocking elements 72a and 72b arranged between the second detector 52 and the resonant scanning mirror 31 at a predetermined distance from each other. The light blocking elements 72a and 72b each include a pair of projections disposed at a predetermined distance facing each other across a gap to transmit the laser beam through the gap and allow the laser beam to be incident on the second detector 52. In order to mount the second light blocking unit 72 as an integrated unit along with other components, like the first light blocking unit 71 as shown in FIG. 2A, the second detector 52 may be mounted on the housing 1 and the second light blocking unit 72 may be formed as an integral injection-molded portion of the injection-molded plastic housing 1.

Although not shown in FIG. 2A, the light source 10, the collimator lens 21, the cylinder lens 22, the deflection unit 30 having the resonant scanning mirror 31, and the fθ lens 40 shown in FIG. 1 may also be mounted on the housing 1 together with the first detector 51 and the second detector 52 as an integrated unit, with the first light blocking unit 71 and the second light blocking unit 72 being formed as integral injection-molded portions of the injection-molded plastic housing 1.

Figure 2B:
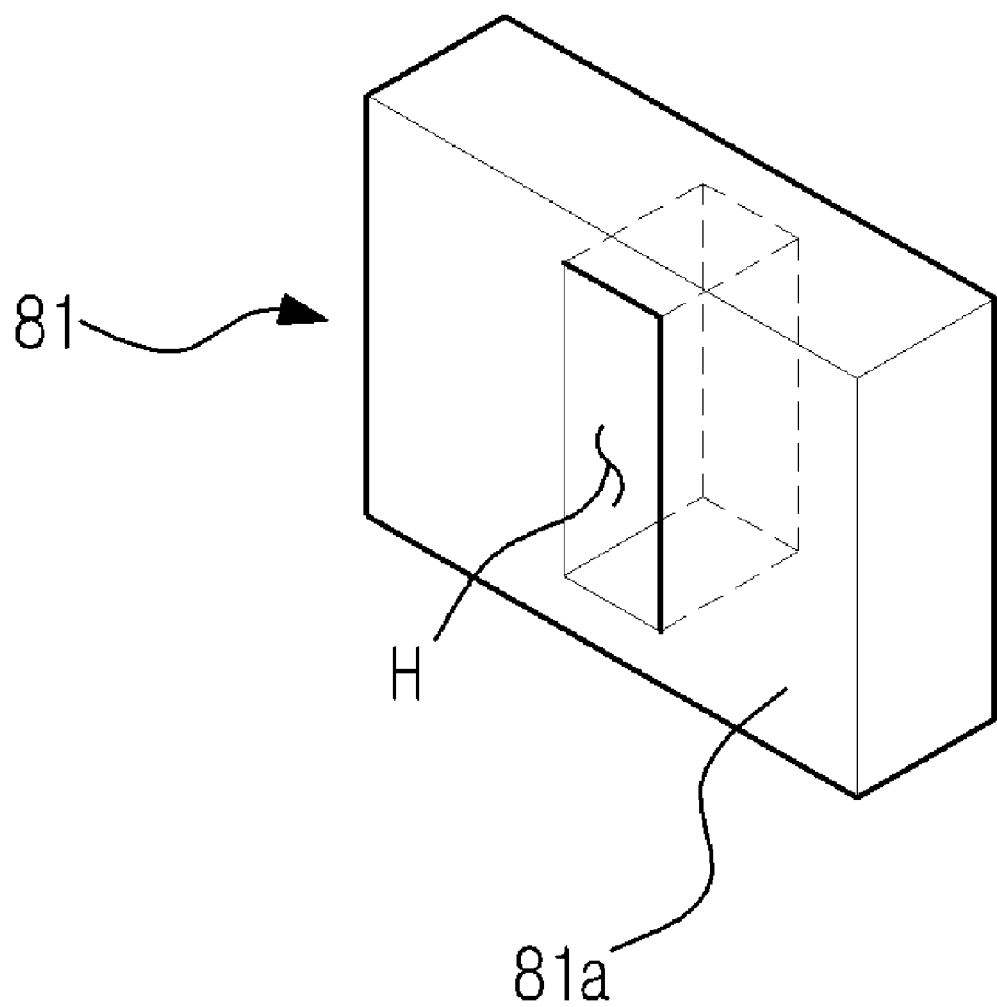
FIG. 2B is a perspective view of a light blocking unit according to an aspect of the invention.

As described above, the first and second light blocking units 71 and 72 according to an aspect of the invention restrict transmission of the laser beam using the plurality of blocking elements 71a, 71b, 72a, and 72b. However, aspects of the invention are not limited to such an arrangement, and a light blocking unit can be implemented in various configurations that are capable of restricting transmission of the laser beam reflected by the resonant scanning mirror 31 to a detector. For example, in FIG. 2B shows another aspect of the invention, wherein a light blocking unit 81 having a slit H formed in a body 81a may transmit the laser beam through the slit H, thereby restricting transmission of the laser beam to a detector.

Figure 3:
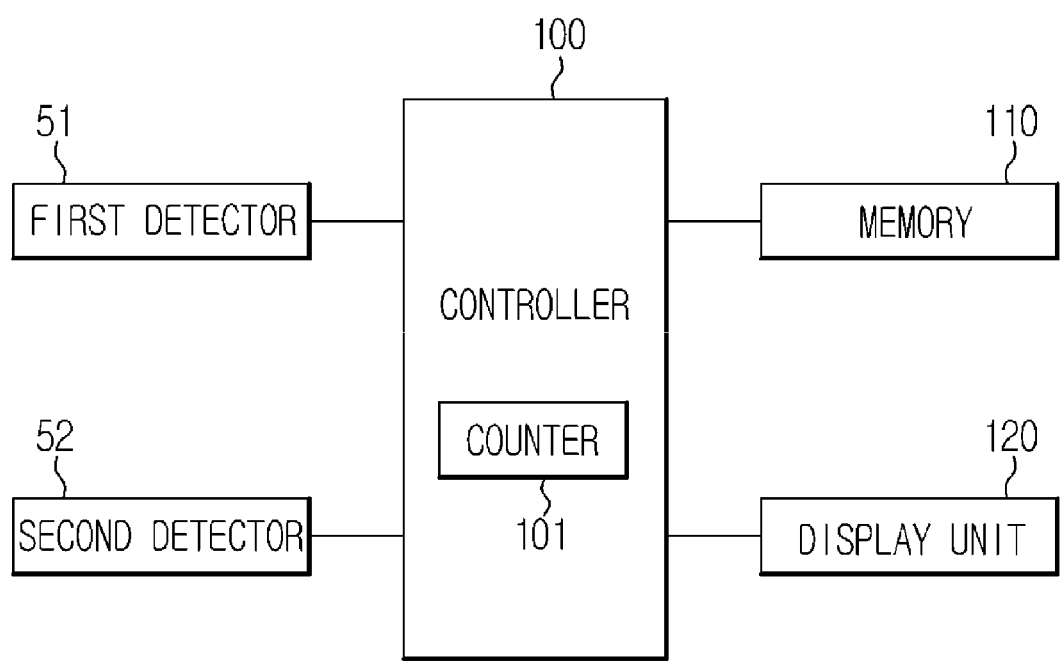
FIG. 3 is a block diagram of a control portion of an image forming apparatus with a laser scanning device according to an aspect of the invention.

FIG. 3 is a block diagram of a control portion of an image forming apparatus with a laser scanning device according to an aspect of the invention. As shown in FIG. 3, in order to confirm whether the resonant scanning mirror 31 is correctly aligned, a controller 100 checks the alignment of the resonant scanning mirror 31 using the synchronizing signals from the first and second detectors 51 and 52.

At the beginning of the scanning, the controller 100 is supplied with the synchronizing signals from the first and second detectors 51 and 52, respectively. The controller 100 is provided with a counter 101 to measure a time difference between detection times of the synchronizing signals.

More specifically, the controller 100 checks the alignment of the resonant scanning mirror 31 of the deflection unit 30 by comparing a time difference between the detection times of the synchronizing signals with a preset reference time stored in a memory 110 using a counter 101. In addition, the controller 100 displays a result of the alignment checking on a display unit 120 for the user's reference so that the user can correct an alignment error of the resonant scanning mirror 31 if necessary.

Figure 4A:
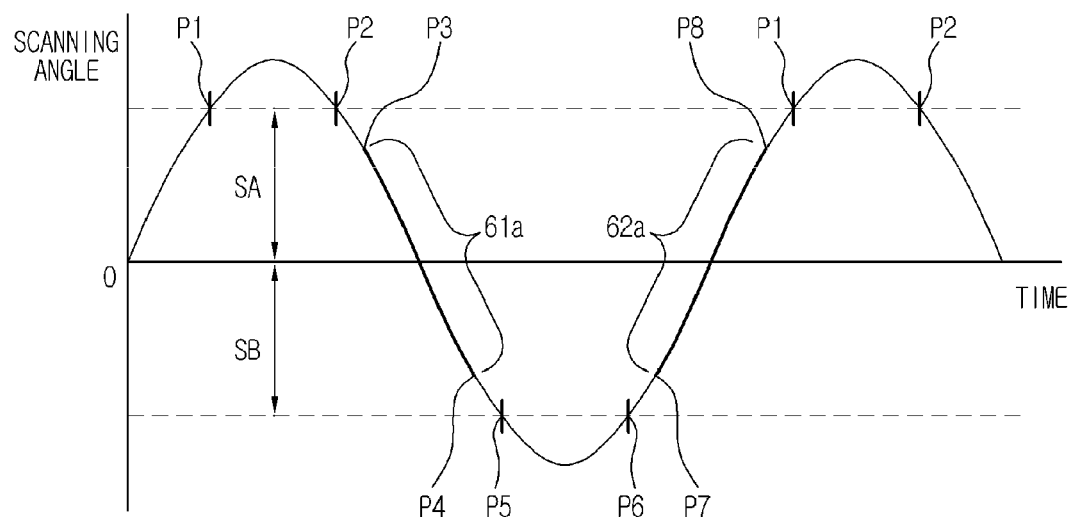
FIG. 4A shows a scanning locus when bidirectional scanning is performed using a deflection unit according to an aspect of the invention.

The operation of checking the alignment of the resonant scanning mirror 31 will now be described in greater detail with reference to FIGS. 4A though 4E.

The laser beam reflected from the resonant scanning mirror 31 performs the scanning in a reciprocating motion. In this case, the scanning locus has a certain cycle as shown in FIG. 4A.

When the leftward scanning is performed from the center line 41 at which a scanning angle is 0°, the laser beam reflected from the resonant scanning mirror 31 moves to the left beyond the range detectable by the first detector 51 and then moves back to the right past the first detector 51, causing the first detector 51 to detect the laser beam twice at detection times P1 and P2.

Figure 4B:
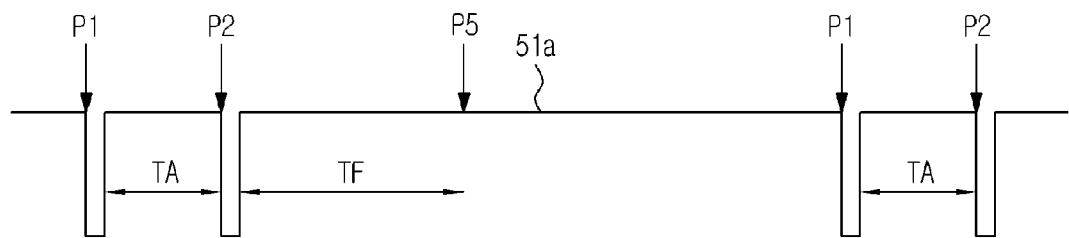
FIG. 4B shows an output signal of a first detector during the bidirectional scanning of FIG. 4A according to an aspect of the invention.

As shown in FIG. 4B, according to an output 51a of the first detector 51 for one cycle of the scanning, the laser beam is detected twice at the detection times P1 and P2. A time difference TA between a first detection time P1 and a second detection time P2 is measured by the counter 101. The controller 100 compares the time difference TA measured by the counter 101 with the reference time stored in the memory 110, thereby determining whether an alignment error of the resonant scanning mirror 31 has occurred, i.e., whether the resonant scanning mirror 31 is aligned correctly. A forward scanning time TF begins at the second detection time P2 and ends at a time P5 described later with respect to FIG. 4D.

Figure 4C:
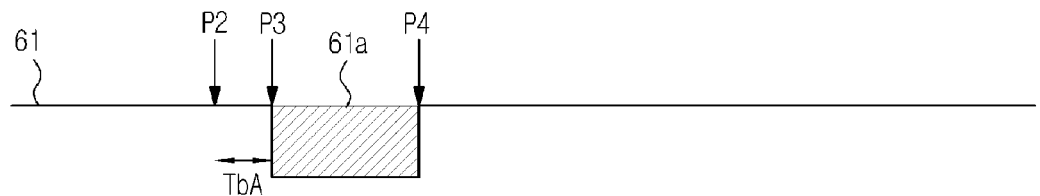
FIG. 4C shows a forward scanning operation of the bidirectional scanning of FIG. 4A being performed on a photoconductive medium according to an aspect of the invention.

Referring to FIG. 4C, beginning at a starting time P3, which is a predetermined time TbA after the second detection time P2, a predetermined section 61a of the first image line 61 is formed on the surface of the photoconductive medium 60 in the forward scanning direction, ending at a completion time P4.

Figure 4D:
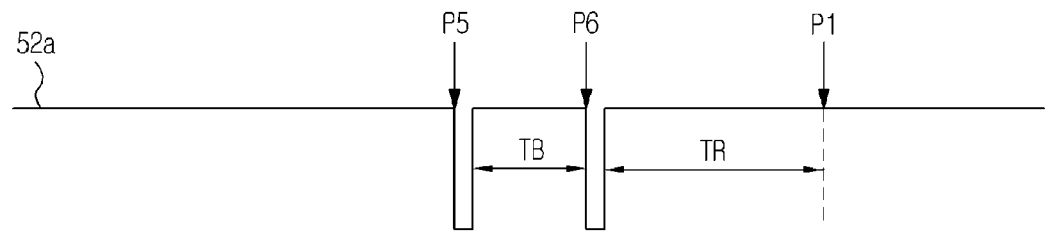
FIG. 4D shows an output signal of a second detector during the bidirectional scanning of FIG. 4A according to an aspect of the invention.

Referring to FIG. 4D, after the forward scanning is completed, the scanning continues to the right past the second detector 52. When the laser beam moves to the right beyond the range detectable by the second detector 52 and then moves back to the left past the second detector 52, the second detector 52 detects the laser beam twice at detection times P5 and P6.

As shown in FIG. 4D, according to an output 52a of the second detector 52 for one cycle of the scanning, the laser beam is detected twice at the detection times P5 and P6. A time difference TB between a first detection time P5 and a second detection time P6 is measured by the counter 101. The controller 100 compares the time difference TB measured by the counter 101 with the reference time stored in the memory 110, thereby determining whether an alignment error of the resonant scanning mirror 31, i.e., whether the resonant scanning mirror 31 is aligned correctly. A backward scanning time TR begins at the second detection time P5 and ends at the first detection time P1 of the forward scanning operation shown in FIG. 4B.

Figure 4E:
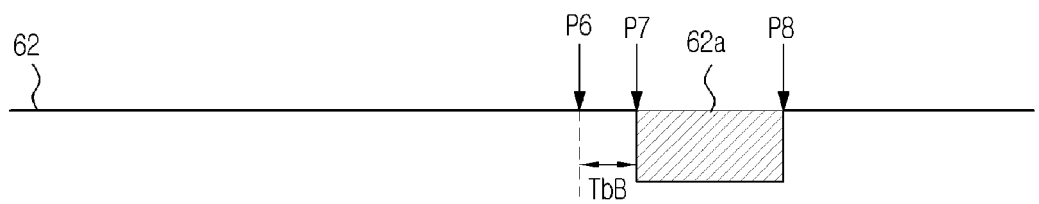
FIG. 4E shows a backward scanning operation of the bidirectional scanning of FIG. 4A being performed on a photoconductive medium according to an aspect of the invention.

Referring to FIG. 4E, beginning at a starting time P7, which is a predetermined time TbB after the second detection time P6, a predetermined section 62a of the second image line 62 is formed on the surface of the photoconductive medium 60 in the backward scanning direction, ending at a completion time P8.

During assembly of the deflection unit 30 into an integrated unit along with the other component parts of the laser scanning device, if the resonant scanning mirror 31 is deviated from the correct position or is mounted incorrectly, thereby causing the scanning area to be asymmetric with respect to the center line 41, the detection times of the plurality of synchronizing signals detected by the first and second detectors 51 and 52 will change. Thus, the alignment error can be detected comparing the time difference between the detection times with the preset reference time stored in the memory 110.

Depending on the particular configuration of the laser scanning device, the time difference TA measured by the counter 101 between the detection times of the synchronizing signals generated by the first detector 51 may be different from the time difference TB measured by the counter 101 between the detection times of the synchronizing signals generated by the second detector 52 even when the resonant scanning mirror is correctly aligned. Therefore, the memory 110 may store a first preset reference time for comparison with the time difference TA, and a second preset reference time for comparison with the time difference TB.

A method of aligning the laser scanning device according to an aspect of the invention will now be described in detail with reference to FIG. 5.

Figure 5:
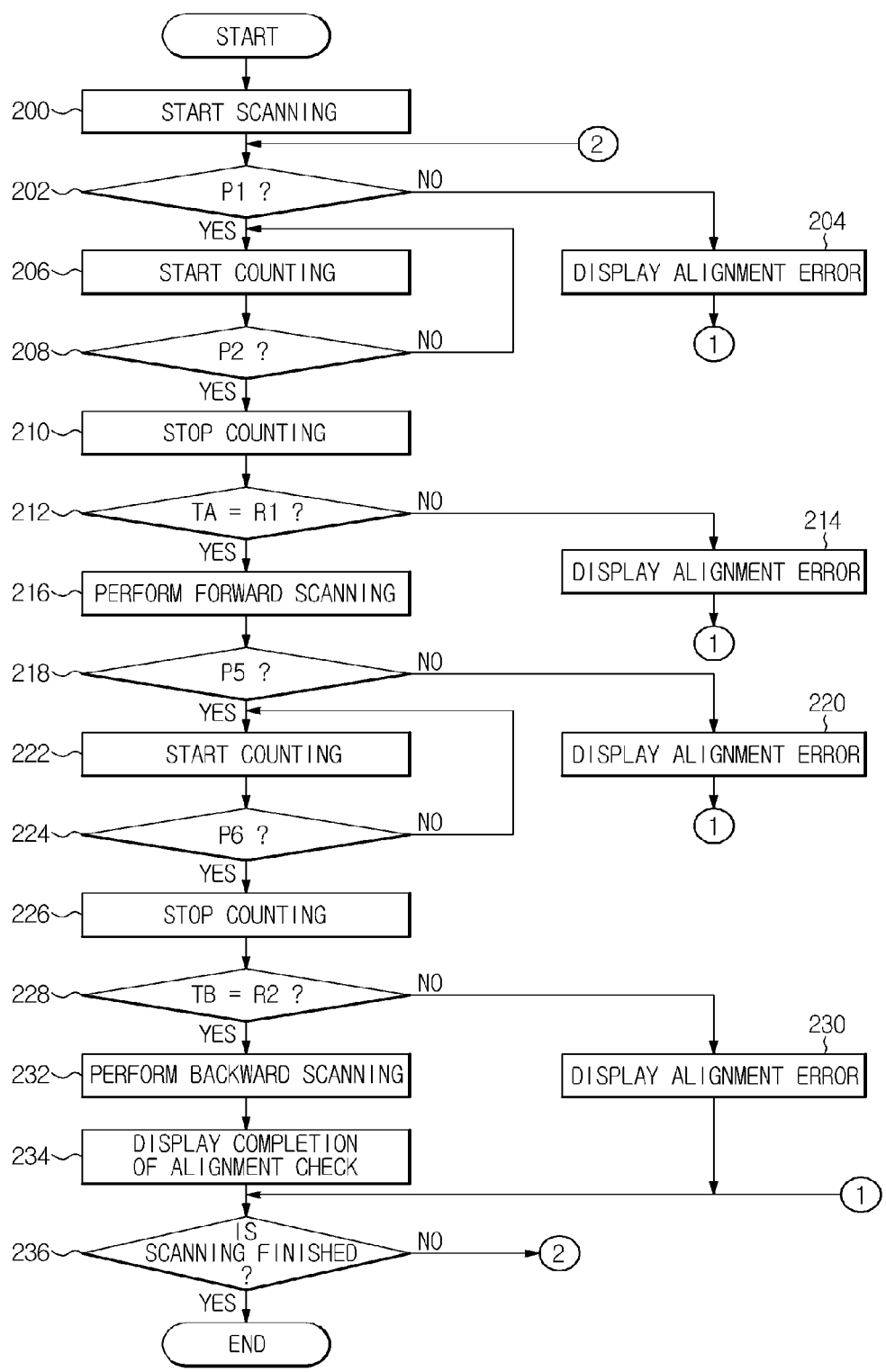
FIG. 5 is a flowchart of a method of aligning the image forming apparatus equipped with the laser scanning device according to an aspect of the invention.

Referring to FIG. 5. the deflection unit 30 is driven by supplying power to the laser scanning device to start scanning the laser beam (operation 200). During the scanning, the laser beam emitted from the light source 10 sequentially passes through the collimator lens 21 and the cylinder lens 22 and is incident on the reflection surface of the resonant scanning mirror 31. After being reflected by the reflection surface that is oscillating at the predetermined resonant frequency and passing through the fθ lens 40, the laser beam performs a scanning operation.

The controller 100 determines the first detection time P1 has occurred depending on whether the synchronizing signal is input from the first detector 51 (operation 202). When it is determined that the synchronizing signal has not been input from the first detector 51 for a predetermined time, the controller 100 displays an alignment error of the resonant scanning mirror 31 on the display unit 120 (operation 204).

When it is determined in the operation 202 that the first detection time P1 at which the synchronizing signal generated by the first detector 51 for the first time has occurred, the counter 101 starts counting beginning at the first detection time P1 (operation 206). The controller 100 then determines whether the second detection time P2 at which the synchronizing signal is generated by the first detector 51 for the second time has occurred (operation 208). When it is determined in the operation 208 that the second detection time P2 has occurred, the controller 100 stops counting at the second detection time P2 (operation 210), and compares the time difference TA measured by the counter 101 with a first preset reference time R1 stored in the memory 110 (operation 212).

When it is determined in the operation 212 that the time difference TA and the first preset reference time R1 are not equal to each other, an alignment error of the resonant scanning mirror 31 is displayed on the display unit 120 (operation 214).

When it is determined in the operation 212 that the time difference TA and the first preset reference time are equal to each other, forward scanning is performed to form the first image line 61 on the surface of the photoconductive medium 60 (operation 216).

Next, the controller 100 determines whether the first detection time P5 at which the synchronizing signal is generated by the second detector 52 for the first time has occurred depending on whether the synchronizing signal is input from the second detector 52 (operation 218). When it is determined that the synchronizing signal has not been input from the second detector 52 for a predetermined time, the controller 100 displays an alignment error of the resonant scanning mirror 31 on the display unit 120 (operation 220).

When it is determined in the operation 218 that the first detection time P5 has occurred, the counter 101 starts counting beginning at the first detection time P5 (operation 222). The controller 100 then determines whether the second detection time P6 at which the synchronizing signal is generated by the second detector 52 for the second time has occurred (operation 224). When it is determined in the operation 224 that the second detection time P6 has occurred, the controller 100 stops the counting at the second detection time P6 (operation 226), and compares the time difference TB measured by the counter 101 with a second preset reference time R2 stored in the memory 110 (operation 228).

When it is determined in the operation 228 that the time difference TB and the second preset reference time R2 are not equal to each other, an alignment error of the resonant scanning mirror 31 is displayed on the display unit 120 (operation 230).

When it is determined in the operation 228 that the time difference TB and the second preset reference time R2 are equal to each other, backward scanning is performed to form the second image line 62 on the surface of the photoconductive medium 60 (operation 232).

Next, the controller 100 displays completion of the alignment check of the resonant scanning mirror 31 on the display unit 120 (operation 234).

Next, the controller 100 determines whether the scanning for checking the alignment is completed (operation 236). If the scanning for checking the alignment is not completed, the controller 100 repeats the operations described above beginning with the operation 202 to check the alignment again. The reason for repeatedly checking the alignment is to guard against a temporary failure in the process of checking the alignment, and thereby improve the reliability of the process of checking the alignment. The number of times the alignment is checked or an alignment checking time during which the alignment is checked may be set in advance to repeat the checking of the alignment for the preset number of times or during the preset alignment checking time.

When it is determined in the operation 236 that the scanning for checking the alignment is completed, the controller 100 stops the scanning, thereby finishing the process of checking the alignment of the resonant scanning mirror 31.

As can be appreciated from the above description, according to aspects of the invention, whether the resonant scanning mirror is correctly aligned can be easily checked by comparing a difference in detection times of the synchronizing signals generated by the detectors with a preset reference time.

Furthermore, since the light selection unit can be implemented by a structure that is an integral injection-molded plastic portion of an injection-molded plastic housing, a number of parts can be reduced, thereby reducing the manufacturing cost.

Although several embodiments of the invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
 a light source to emit a laser beam;
 a resonant scanning mirror, including a reflection surface to reflect the laser beam emitted from the light source, and to scan the reflected laser beam by oscillating the reflection surface;
 at least one detector to detect the reflected laser beam during the scanning of the reflected laser beam, and generate a synchronizing signal each time the reflected laser beam is detected; and
 at least one light blocking unit, separate from the at least one detector and spaced between the at least one detector and the resonant scanning mirror, to restrict a path over which the reflected laser beam is incident on the at least one detector to a predetermined path,
 wherein the laser beam passes the at least one light blocking unit with each scan in one direction, and
 wherein the laser beam is incident on the at least one detector only when the resonant scanning mirror is disposed at a reference position and is operating normally, and when the resonant scanning mirror is deviated from the reference position, or when a scanning area of the laser beam is asymmetrical with respect to a center line, even though the resonant scanning mirror is disposed at the reference position but is not operating normally, the light blocking unit prevents the laser beam from being incident on the at least one detector.

2. The apparatus of claim 1, wherein:
 the at least one detector comprises a plurality of detectors; and
 the at least one light blocking unit includes a plurality of light blocking units corresponding to the plurality of detectors.

3. The apparatus of claim 2, wherein:
 each of the light blocking units comprises a plurality of light blocking elements arranged at different predetermined positions between a corresponding one of the detectors and the resonant scanning mirror; and
 each of the light blocking elements is a pair of projections facing each other across a gap.

4. The apparatus of claim 2, wherein each of the light blocking units comprises a body having a slit formed therein.

5. The apparatus of claim 1, further comprising:
a deflection unit including the resonant scanning mirror; and
a housing on which the light source, the deflection unit including the resonant scanning mirror, and the detector are mounted as an integrated unit;
wherein the at least one light blocking unit is an integral part of the housing.

6. The apparatus of claim 5, wherein:
the housing is an injection-molded plastic housing; and
the at least one light blocking unit is an integral injected-molded plastic portion of the injection-molded plastic housing.

7. An apparatus comprising:
a light source to emit a laser beam;
a resonant scanning mirror to reflect the laser beam emitted from the light source, and scan the reflected laser beam in a plurality of scanning directions,
wherein the resonant scanning mirror is movable into a least a predetermined reference position;
a plurality of detectors to detect the reflected laser beam during the scanning of the reflected laser beam, and generate synchronizing signals for each of the plurality of scanning directions;
a light blocking unit, separate from the plurality of detectors and spaced between the plurality of detectors and the resonant scanning mirror, to restrict paths over which the reflected laser beam is incident on the plurality of detectors to a plurality of predetermined paths,
wherein the laser beam passes the light blocking unit with each scan in one direction; and
an alignment checking unit to check an alignment of the resonant scanning mirror based on the synchronizing signals generated by the plurality of detectors when the reflected laser beam is incident on the plurality of detectors over the plurality of predetermined paths,
wherein the laser beam is incident on the at least one detector only when the resonant scanning mirror is disposed at a reference position and is operating normally, and when the resonant scanning mirror is deviated from the reference position, or when a scanning area of the laser beam is asymmetrical with respect to a center line, even though the resonant scanning mirror is disposed at the reference position but is not operating normally, the light blocking unit prevents the laser beam from being incident on the at least one detector.

8. The apparatus of claim 7, wherein the alignment checking unit comprises:
a controller to:
detect the synchronizing signals generated by the detectors;
determine a time difference between detection times of two synchronizing signals generated by each of the detectors during one scanning cycle of the resonant scanning mirror;
compare the time difference with a preset reference time; and
determine whether the resonant scanning mirror is aligned correctly based on a result of the comparison;
a memory to store information indicative of the preset reference time; and
a display unit to display an indication of whether the resonant scanning mirror is aligned correctly under control of the controller.

9. The apparatus of claim 8, wherein the two synchronizing signals comprise:
a first synchronizing signal generated when the resonant scanning mirror is scanning the reflected laser beam in a first scanning direction; and
a second synchronizing signal generated when the resonant scanning mirror is scanning the reflected laser beam in a second scanning direction different from the first scanning direction.

10. The apparatus of claim 7, wherein each of the detectors comprises an optical sensor.

11. The apparatus of claim 7, wherein the controller comprises a counter to determine the time difference.

12. The apparatus of claim 7, wherein the resonant scanning mirror comprises a reflection surface that oscillates at a predetermined resonant frequency to perform forward and backward scanning.

13. A method of aligning an image forming apparatus comprising:
emitting a laser beam from a light source so that the laser beam is incident on a resonant scanning mirror and is reflected by the resonant scanning mirror;
oscillating the resonant scanning mirror to scan the reflected laser beam in a plurality of scanning directions;
restricting, at a position separate from and spaced from the resonant scanning mirror and at least one detector, a path over which the reflected laser beam is incident on the at least one detector to a predetermined path,
wherein said restricting occurs at each scan in one direction;
detecting a synchronizing signal generated by the at least one detector when the reflected laser beam is incident on the at least one detector over the predetermined pat,
wherein the laser beam is incident on the at least one detector only when the resonant scanning mirror is disposed at a reference position and is operating normally, and when the resonant scanning mirror is deviated from the reference position, or when a scanning area of the laser beam is asymmetrical with respect to a center line, even though the resonant scanning mirror is disposed at the reference position but is not operating normally, the light blocking unit prevents the laser beam from being incident on the at least one detector;
determining a time difference between detection times of two synchronizing signals generated by the at least one detector;
comparing the time difference with a preset reference time;
determining whether the resonant scanning mirror is aligned correctly based on a result of the comparison; and
displaying an indication of whether the resonant scanning mirror is aligned correctly.

14. The aligning method of claim 13, wherein:
the at least one detector comprises a plurality of detectors; and
the determining of a time difference includes determining a time difference between detection times of two synchronizing signals generated by each of the detectors during one scanning cycle of the resonant scanning mirror.

15. The aligning method of claim 13, wherein the determining of whether the resonant scanning mirror is aligned correctly comprises determining that the resonant scanning mirror is not aligned correctly when the time difference is not equal to the preset reference time.

16. The aligning method of claim 13, wherein the two synchronizing signals comprise:
a first synchronizing signal generated when the reflected laser beam is being scanned by the resonant scanning mirror in a first scanning direction; and
a second synchronizing signal generated when the reflected laser beam is being scanned by the resonant scanning mirror in a second scanning direction different from the first scanning direction.

17. A laser scanning device comprising:
a light source to emit a laser beam;
a resonant scanning mirror to reflect the laser beam emitted from the light source and alternately scan the reflected laser beam in a first scanning direction between a first scan end point and a second scan end point, and a second scanning direction between the second scan end point and the first scan end point;
a first detector to detect the reflected laser beam and generate a first synchronizing signal when the reflected laser beam is approaching the first scan end point while being scanned in the second scanning direction, and a second synchronizing signal when the reflected laser beam is receding from the first scan end point while being scanned in the first scanning direction; and
a first light blocking unit, separate from and spaced from the first detector and the resonant scanning mirror, to prevent the reflected laser beam from being incident on the first detector during the scanning of the reflected laser beam,
wherein the laser beam passes the first light blocking unit while scanning in one direction, and
wherein the laser beam is incident on the first detector only when the resonant scanning mirror is disposed at a reference position and is operating normally, and when the resonant scanning mirror is deviated from the reference position, or when a scanning area of the laser beam is asymmetrical with respect to a center line, even though the resonant scanning mirror is disposed at the reference position but is not operating normally, the first light blocking unit prevents the laser beam from being incident on the first detector.

18. The laser scanning apparatus of claim 17, further comprising a controller to:
detect the first synchronizing signal and the second synchronizing signal;
determine a first time difference between a detection time of the first synchronizing signal and a detection time of the second synchronizing signal;
compare the first time difference with a first preset reference time; and
determine whether the resonant scanning mirror is correctly aligned based on a result of the comparison.

19. The laser scanning device of claim 18, wherein the controller determines that the resonant scanning mirror is not correctly aligned when the controller does not detect the first synchronization signal within a predetermined time, or when the first time difference is not equal to the first preset reference time.

20. The laser scanning device of claim 18, wherein the controller determines that the resonant scanning mirror is correctly aligned when the first time difference is equal to the first preset reference time.

21. The laser scanning device of claim 17, further comprising:
a second detector to detect the reflected laser beam and generate a third synchronizing signal when the reflected laser beam is approaching the second scan end point while being scanned in the first scanning direction, and a fourth synchronizing signal when the reflected laser beam is receding from the second scan end point while being scanned in the second scanning direction; and
a second light blocking unit to prevent the reflected laser beam from being incident on the second detector during the scanning of the reflected laser beam
wherein the laser beam passes the second light blocking unit while scanning in a second direction, and
wherein the laser beam is incident on the second detector only when the resonant scanning mirror is disposed at a reference position and is operating normally, and when the resonant scanning mirror is deviated from the reference position, or when a scanning area of the laser beam is asymmetrical with respect to a center line, even though the resonant scanning mirror is disposed at the reference position but is not operating normally, the second light blocking unit prevents the laser beam from being incident on the second detector.

22. The laser scanning apparatus of claim 21, further comprising a controller to:
detect the first synchronizing signal, the second synchronizing signal, the third synchronizing signal, and the fourth synchronizing signal;
determine a first time difference between a detection time of the first synchronizing signal and a detection time of the second synchronizing signal;
determine a second time difference between a detection time of the third synchronizing signal and a detection time of the fourth synchronizing signal;
compare the first time difference with a first preset reference time;
compare the second time difference with a second preset reference time; and
determine whether the resonant scanning mirror is correctly aligned based on a result of the two comparisons.

23. The laser scanning device of claim 22, wherein the controller determines that the resonant scanning mirror is not correctly aligned when the controller does not detect the first synchronization signal within a predetermined time, or when the first time difference is not equal to the first preset reference time, or when the controller does not detect the third synchronization signal within a predetermined time, or when the second time difference is not equal to the second preset reference time.

24. The laser scanning device of claim 22, wherein the controller determines that the resonant scanning mirror is correctly aligned when the first time difference is equal to the first preset reference time, and the second time difference is equal to the second preset reference time.

* * * * *

UNITED STATES PATENT AND TRADEMARK OFFICE
CERTIFICATE OF CORRECTION

PATENT NO.        : 8,027,073 B2
APPLICATION NO.   : 12/133502
DATED             : September 27, 2011
INVENTOR(S)       : Kyung Min Lim Page 1 of 1

It is certified that error appears in the above-identified patent and that said Letters Patent is hereby corrected as shown below:

First Page, Item 74 Column 2 (Attorney, Agent, or Firm), Line 1, After "Staas" insert -- & --.

Signed and Sealed this
Twenty-first Day of February, 2012

David J. Kappos
*Director of the United States Patent and Trademark Office*